United States Patent [19]
Jacobsen et al.

[11] 3,976,576
[45] Aug. 24, 1976

[54] DIALYZER CARTRIDGE

[75] Inventors: Stephen C. Jacobsen; Homer R. Smith; Tawny R. Koncher, all of Salt Lake City, Utah

[73] Assignee: The University of Utah, Salt Lake City, Utah

[22] Filed: June 12, 1975

[21] Appl. No.: 586,490

Related U.S. Application Data
[63] Continuation of Ser. No. 456,695, Jan. 1, 1974, abandoned.

[52] U.S. Cl. .............................. 210/321 B; 264/258
[51] Int. Cl.² ......................................... B01D 31/00
[58] Field of Search ............... 210/321; 29/163.5 F; 264/258

[56] References Cited
UNITED STATES PATENTS
3,746,175  7/1973  Markley ..................... 210/500 X Primary Examiner—Frank A. Spear, Jr.
Attorney, Agent, or Firm—Criddle, Thorpe & Western

[57] ABSTRACT

A dialyzer cartridge includes a resilient gasket defining a central hollow area, and first and second cross members affixed in and extending between the interior side walls of the gasket to divide the hollow area into first, second and third portions. The ends of a plurality of hollow fibers are embedded in respective cross members to extend across the second portion of the hollow between the first and third portions. A first fluid is introduced into the first portion to be transported through the fibers to the third portion and a second fluid is introduced into the second portion to flow about the fibers and thereby facilitate the process of dialysis between the interior and exterior of the fibers. The second portion of the hollow is sealed from the first and third portions by a pair of plates secured together with the gasket sandwiched therebetween.

10 Claims, 3 Drawing Figures

DIALYZER CARTRIDGE

This is a continuation of application Ser No. 456,695, filed Apr. 1, 1974, now abandoned.

BACKGROUND OF THE INVENTION

This invention relates to structure for facilitating the process of dialysis in artificial kidney systems and the like.

In artificial kidney systems, blood is withdrawn from a patient and applied to a dialyzer through which dialysate solution is circulated and then, by the process of dialysis, chemical wastes, electrolytes and water in the blood pass into the dialysate solution (and in some cases vice versa) through thin walls of a membrane structure, such as hollow fibers, carrying the blood. The dialysate solution containing the wastes and water is drawn from the dialyzer and disposed and the blood is returned to the patient. This process of transporting wastes and water from the blood is referred to as hemodialysis.

Currently used dialyzers of dialyzer cartridges typically include a bundle of hollow fibers potted at either end in rubber or other suitable material for holding the fibers. The cross section of the bundle and the potting material is circular to enable insertion of the bundle into a cylindrically-shaped container. Blood is then introduced into one end of the container to flow through the fibers to the other end and dialysate solution is introduced near the central portion of the container to flow about the exterior surfaces of the fibers and then out again. With this configuration, the cross-sectional area of the potting material is rather large and, since the material is supported only around its periphery, pressures caused by the dialysate solution and the blood may cuase the material to deform, fracture and leak. This configuration may also present fabrication problems, from a quality control standpoint, because of the large cross-sectional area of the potting material and the difficulty of depositing potting material around the ends of the fibers. Finally, the cylindrically-shaped dialyzer cartridge container can accommodate only one fiber bundle size thus necessitating a change in both the container and the fiber bundle when a dialyzer cartridge having a different dialyzing effective area is desired.

SUMMARY OF THE INVENTION

It is an object of the present invention to provide a new and improved dialyzer cartridge.

It is also an object of the present invention to provide a dialyzer cartridge and potting material configuration which is less subject to flexing, fracturing and leaking.

It is a further object of the present invention to provide a dialyzer cartridge which may be easily and economically fabricated.

It is still another object of the present invention to provide a dialyzer cartridge whose container structure may accommodate membrane elements of various sizes and volumes.

These and other objects of the present invention are realized in a specific illustrative embodiment which includes a resilent gasket member defining a hollow, resilent first and second cross members extending between interior side walls of the gasket member to divide the hollow into first, second and third portions, and membrane elements extending across the second portion of the hollow from the first portion to the third portion for carrying fluid therebetween. One fluid may be introduced into the first portion of the hollow for transport through the membrane elements to the third portion, and another fluid may be introduced into the second portion of the hollow to circulate about the membrane means and thereby facilitate the dialysis process.

BRIEF DESCRIPTION OF THE DRAWINGS

For a better understanding of the present invention, together with other and further objects and features thereof, reference is made to the following detailed description taken in connection with the accompanying drawings described as follows.

DETAILED DESCRIPTION

Figure 1:
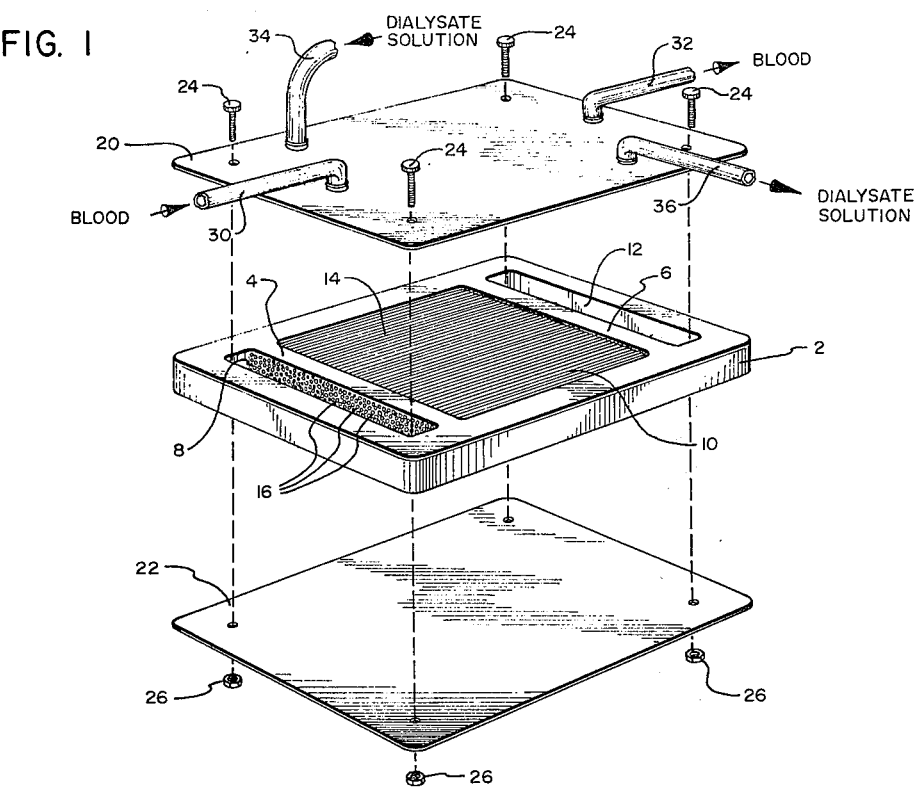
FIG. 1 is an exploded, perspective view of a dialyzer cartridge made in accordance with the present invention.

The dialyzer cartridge of FIG. 1 will be described assuming that the cartridge is to be used for hemodialysis. As will be apparent, however, the cartridge could be used for various types of dialysis. As shown in FIG. 1, the cartridge includes a generally rectangularly-shaped gasket member 2 circumscribing and defining a hollow area therewithin. The gasket 2 is constructed of a resilent material such as silicone rubber or polymethylmethacralate. A pair of cross members 4 and 6, advantageously constructed of the same material as the gasket 2, extend between parallel interior side walls of the gasket 2 to divide the hollow area defined by the gasket into three portions or subsections 8, 10 and 12. The cross memers 4 and 6 may be molded integral with the gasket 2 or may be fabricated separately and then affixed in the gasket 2 by a suitable adhesive. The gasket 2 and cross members 4 and 6 define a generally planar profile having a substantially uniform thickness.

A plurality of membrane elements in the form of hollow fibers 14 extend between the cross members 4 and 6 and across the central hollow portion 10. The ends of the fibers are embedded in and carried by respective ones of the cross members 4 and 6 to hold the fibers in place. The terminations of the fibers extend through corresponding cross members into the two end hollow portions 8 and 12. A portion of the terminations of the fibers 14 which extend into the hollow portion 8 are shown at 16 of FIG. 1. The hollow fibers 14 may be constructed on cellulose or other semipermeable membrane.

Embedding the fibers in the cross members may be accomplished in a variety of ways. For example, a few of the fibers may be positioned in a form or mold and unsolidified room temperature vulcanizing silicone rubber applied thereto. When the applied silicone rubber cures or solidifies, more fibers may be layed in place and more unsolidified silicone rubber applied to the fibers. This process can be repeated until the desired number of fibers are secured in the silicone rubber cross members. If desired, the fibers and silicone rubber may be cut at either end thereof to neatly "square off" the fiber terminations.

The structure for supporting and containing the gasket 2 and fibers 14 includes a pair of generally flat plates 20 and 22. The plates 20 and 22 are respectively placed above and below the gasket 2 and then secured together by bolts 24, inserted through holes in the plates 20 and 22 and through the hollow portions 8 and 12, and by nuts 26 screwed onto the bolts. The plates 20 and 22 are urged together by tightening the nuts on the bolts to thereby compress the gasket 2 and cross members 4 and 6 to thereby seal each of the hollow portions 8, 10 and 12 from the others. That is, the plate 20 is urged against the upper surfaces of the gasket 2 and cross members 4 and 6, and the plate 22 is urged against the bottom surfaces thereof to thus form the necessary seals. Of course, a variety of arrangements could be used to secure the plates 20 and 22 together, including various releasable clamping mechanisms.

Providing resilient cross members 4 and 6 in which to embed the fibers 14 results in the fibers being more securely held in place when the cross members are compressed by the plates 20 and 22. Specifically, the resilient cross member material is forced tightly against and about the fibers so that entry of blood or dialysate solution between the fibers and cross member material is prevented. This structure provides a reliable, leak-free dialyzer cartridge.

Figure 2:
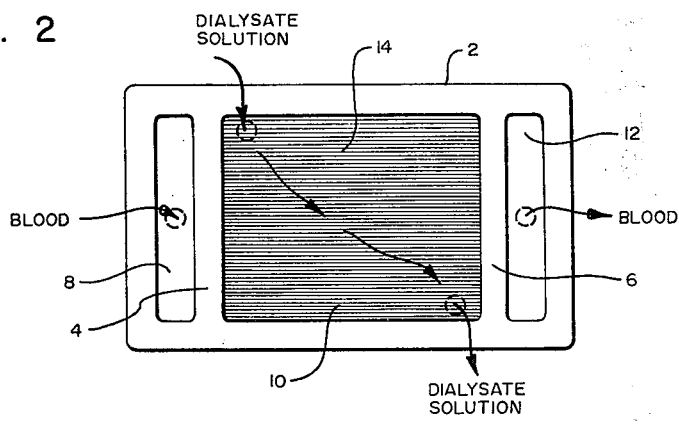
FIG. 2 is a top view of the gasket member and the membrane structure of the dialyzer cartridge of FIG. 1.

When the plates and gasket are secured in place, blood from a patient is introduced into the dialyzer cartridge through a conduit or tube 30 attached to the plate 20 over an opening therein. The opening in the plate 20 is positioned over the hollow portion 8 so that blood applied to the tube 30 flows into the hollow portion 8. The tube 30 may be attached to the plate 20 by any suitable means which will enable conveyance of blood into the hollow portion 8 while preventing leaking. For example, a raised cylindrical nipple could be formed in the plate 20 over which the end of the conduit 30 could be positioned and held in place by a suitable clamp. The blood introduced into the hollow portion 8 flows through the fibers 14 to the hollow portion 12 and from there the blood is carried from the dialyzer cartridge by a tube 32 attached to the plate 20 over an opening in the plate. Again, the opening over which the tube 32 is attached is positioned over the hollow portion 12. The positioning of the openings in the plate 20 are shown by dotted circles in FIG. 2.

The dialysate solution is introduced and removed from the central hollow portion 10 in a similar fashion. Specifically, the dialysate solution is introduced via tube 34 into one corner of the central hollow portion 10 and the solution flows and circulates about the fibers and then out tube 36. As the blood flows through the fibers 14 and the dialysate solution flows around the fibers, dialysis takes place and chemical wastes, electrolytes and water in the blood pass through the walls of the fibers into the dialysate solution.

With the structure shown and described, gaskets of various thicknesses can be accommodated between plates 20 and 22 and thus the membrane or fiber wall area may be varied simply by substituting gaskets of different thicknesses having different numbers of fibers. In addition, the flat profile of the dialyzer cartridge facilitates ease of packing and shipping. It may be desirable to ship the gasket in a sterile membrane cover (to maintain the gasket in a sterilized condition), which could remain fitted over the gasket when the gasket were positioned between the plates (provided approprite holes were made in the membrane to allow introduction and exit of blood and dialysate solution). The cross members 4 and 6 securing the fibers 14 provide a rugged support for the fibers since the thickness of the cross members and thus the distance between points of support of the cross members by the plates 20 and 22 is relatively small. That is, there is little chance for deformation and fracturing of the cross members due to fluid pressures introduced into the dialyzer cartridge.

Figure 3:
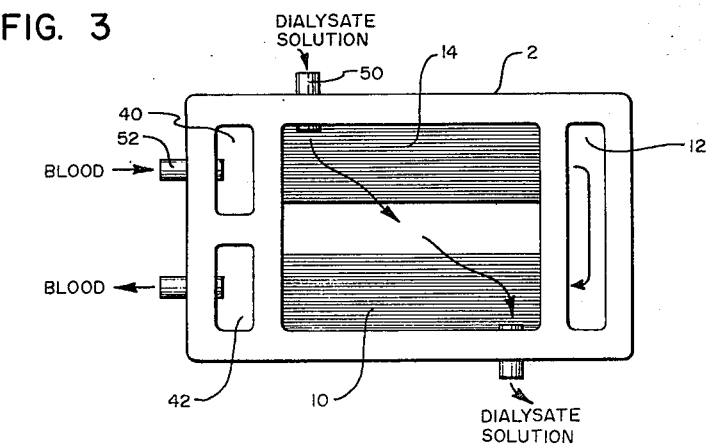
FIG. 3 is a top view of an alternative embodiment of the gasket member and membrane structure.

FIG. 3 shows an alternative embodiment of a dialyzer gasket and membrane structure. In this embodiment, two hollows or sections 40 and 42 are formed in one end of the gasket 2 with a central hollow portion 10 and an opposite end hollow portion 12 also formed in the gasket, as in the FIGS. 1 and 2 embodiment. Hollow fibers 14 extend across the central hollow portion 10 between the hollow section 40 and hollow portion 12 and between the portion 12 and hollow section 42. With this configuration, dialysate solution is introduced into the central hollow portion 14, through a section of tube 50 extending through the side wall of the gasket 2, and blood in introduced into the section 40, through a section of tube 52 extending through the end wall of the gasket, to flow through fibers 14 to the hollow portion 12 and then through fibers 14 to the section 42. This provides a longer membrane pathway for the blood to travel through the dialysate solution, thereby facilitating greater exposure of the blood to the dialysis process. Of course, plates 20 and 22 would be provided with the gasket configuration of FIG. 3. In this case, no openings in the plates would be needed since the blood and dialysate solution is introduced into and removed from the cartridge through sections of tube extending through the walls of the gasket.

It is to be understood that the above-described embodiments are only illustrative of the principles of the present invention. Other embodiments may be described by those skilled in the art without departing from the spirit and scope of the invention, and the appended claims are intended to cover such embodiments.

What is claimed is:
1. A dialyzer cartridge comprising
a gasket member defining a hollow,
first and second cross members affixed in and extending between the side walls of the gasket member to divide the hollow into first, second and third portions,
said gasket member and cross members being constructed of a resilient material,
membrane means for carrying fluid, said membrane means being embedded in the cross members to extend therebetween across the second portion of the hollow to provide a passageway for carrying the fluid between the first and third portion of the hollow,
a pair of plates for securing the gasket member therebetween, the gasket member, cross members and plates defining a substantially planar profile,
means for urging the two plates together to compress the gasket member and cross members therebetween and to press the cross member material against the membrane means to thereby seal the first and third portions from the second portion,
means for introducing fluid into the first portion and to flow through the membrane means to the third portion,
means for introducing fluid into the second portion to flow about the exterior surface of the membrane means.

2. A dialyzer cartridge as in claim 1 wherein said gasket member and cross members are composed of silicone rubber.

3. A dialyzer cartridge as in claim 1 wherein said gasket member and cross members are composed of polymethylmethacralate.

4. A dialyzer cartridge as in claim 1 wherein at least one of said plates has an aperture therein through which fluid may be introduced into the first portion of the hollow, wherein at least one of said plates has an aperture therein through which fluid may be received from the third portion of the hollow, wherein at least one of said plates has an aperture therein through which fluid may be introduced into the second portion of the hollow, and wherein at least one of said plates has an aperture therein through which fluid may be received from the second portion.

5. A dialyzer cartridge as in claim 1 wherein the side walls of the gasket member have a first opening through which fluid may be introduced into the first portion of the hollow, a second opening through which fluid may be received from the third portion of the hollow, a third opening through which fluid may be introduced into the second portion of the hollow, and a fourth opening through which fluid may be received from the second portion of the hollow.

6. A dialyzer cartridge as in claim 1 wherein said membrane means includes a plurality of hollow fibers the ends of which are embedded in respective cross members to extend from the first portion to the third portion of the hollow for carrying fluid therebetween.

7. A dialyzer cartridge as in claim 1 further comprising means dividing the first portion of the hollow into first and second sections, means for introducing fluid into the first section, said fluid flowing from the first section through the membrane means to the third portion of the hollow and then through the membrane means to the second section, and means for receiving fluid from the second section.

8. A dialyzer cartridge as in claim 7 wherein at least one of said plates has an aperture therein contiguous with the first portion of the hollow, wherein at least one of the plates has an aperture therein contiguous with the second portion of the hollow, and wherein said introducing means comprise a pair of conduits attached to the plates over respective apertures to enable the flow of fluid through the conduits and the apertures to the respective portions of the hollow.

9. A dialyzer cartridge comprising
a resilient gasket member defining a hollow,
first and second resilient cross members affixed in and extending between interior side walls of the gasket member to divide the hollow into first, second and third portions,
a plurality of hollow fibers embedded in and extending between the cross members across the second portion, the ends of the fibers extending through respective cross members into the first and third portions of the hollow to thereby provide passages between the first and third portions through which fluid may be carried,
a pair of plates,
means for securing one of the plates in engagement with the top surface of the gasket member and the other of the plates in engagement with the bottom surface of the gasket member to thereby compress the gasket member between the plates and the cross members tightly about the fibers to seal the first and third portions of the hollow from the second portion,
means for introducing fluid into the first portion of the hollow to flow through the fibers to the third portion, and
means for introducing fluid into the second portion of the hollow to flow about the fibers.

10. A method of constructing a dialyzer cartridge including providing a resilient gasket member which defines a hollow therein, providing resilient first and second cross members affixed in and extending between the side walls of the gasket member to divide the hollow into first, second and third portions,
embedding a plurality of hollow fibers in the first and second cross members to extend therebetween across the second portion of the hollow to thereby provide passageways for carrying fluid between the first and third portions of the hollow, and
compressing the gasket member and cross members between a pair of plates to seal the first and third portions from the second portion and to compress the cross member material against and about the fibers.

* * * * *